United States Patent [19]

Brüening et al.

[11] 4,190,425
[45] Feb. 26, 1980

[54] PROCESS FOR THE PREPARATION OF SILICIOUS POLYMERIC MATERIALS AND THEIR APPLICATIONS IN THE SEPARATION OF FLUIDS IN GASEOUS PHASE

[75] Inventors: Wilhelm Brüening; Inái M. R. deA. Brüening, both of Rio de Janeiro, Brazil

[73] Assignee: Petroleo Brasileiro S.A.-Petrobas, Rio de Janeiro, Brazil

[21] Appl. No.: 919,656

[22] Filed: Jun. 28, 1978

Related U.S. Application Data

[63] Continuation of Ser. No. 723,267, Sep. 14, 1976, abandoned, which is a continuation of Ser. No. 421,871, Dec. 5, 1973, abandoned.

[51] Int. Cl.$^2$ ............................................. B01D 15/08
[52] U.S. Cl. ...................................... 55/67; 210/31 C
[58] Field of Search ................. 55/67, 386; 210/31 C, 210/198 C

[56] References Cited

U.S. PATENT DOCUMENTS

| | | | |
|---|---|---|---|
| 2,728,740 | 12/1959 | Iler | 260/42.53 |
| 3,065,185 | 11/1962 | Burns et al. | 252/428 |
| 3,347,020 | 10/1967 | Venrooy | 55/67 |
| 3,660,966 | 5/1972 | Finch | 55/67 |
| 3,672,131 | 6/1972 | Halasz | 55/386 |
| 3,757,490 | 9/1973 | Ma | 55/67 |
| 3,984,349 | 10/1976 | Meillea | 210/31 C |

Primary Examiner—John Adee
Attorney, Agent, or Firm—Sughrue, Rothwell, Mion, Zinn and Macpeak

[57] ABSTRACT

This invention relates to a process for the preparation of silicious polymeric materials and their use in the separation of fluids in the gaseous phase, wherein the materials are obtained through three basic procedures: (a) polymerization of monomeric substances in the presence of high purity submicroscopic silica particles in which the polymerization of the monomers can be followed by a deactivation reaction with silylating agent; (b) addition of high purity submicroscopic silica particles to monomeric substances, and coupling regents, which will react with surface hydroxyl groups on the silica and a polymer or monomers which are forming a polymer in the reaction medium; (c) through dispersion of the high purity submicroscopic particles in plymeric organic substances. The materials obtained in this invention are solid, usually white, highly porous, of relatively high surface area, thermally stable and have good mechanical strength, and when used as a packing material in a gas chromatographic column provide excellent results with respect to permeability, efficiency, and selectivity.

15 Claims, 4 Drawing Figures

SECOND PROCEDURE OF SYNTHESIS

1 METHANOL
2 ETHANOL
3 PROPANOL
4 TERTIARY PENTANOL
5 ISOBUTANOL
6 N-BUTANOL
7 ISOPENTANOL
8 N-PENTANOL

SEPARATION OF AN ALCOHOL MIXTURE

FIRST PROCEDURE OF SYNTHESIS

MINUTES

1 METHANE
2 ETHANE
3 PROPANE
4 CYCLOPROPANE
5 ISOBUTANE
6 N-BUTANE
7 NEOPENTANE

SEPARATION OF SATURATED GASEOUS HYDROCARBONS

SECOND PROCEDURE OF SYNTHESIS

MINUTES

TEMPERATURE PROGRAMMED AT 4°C/MIN

1 METHANOL
2 ETHANOL
3 PROPANOL
4 TERTIARY PENTANOL
5 ISOBUTANOL
6 N-BUTANOL
7 ISOPENTANOL
8 N-PENTANOL

SEPARATION OF AN ALCOHOL MIXTURE

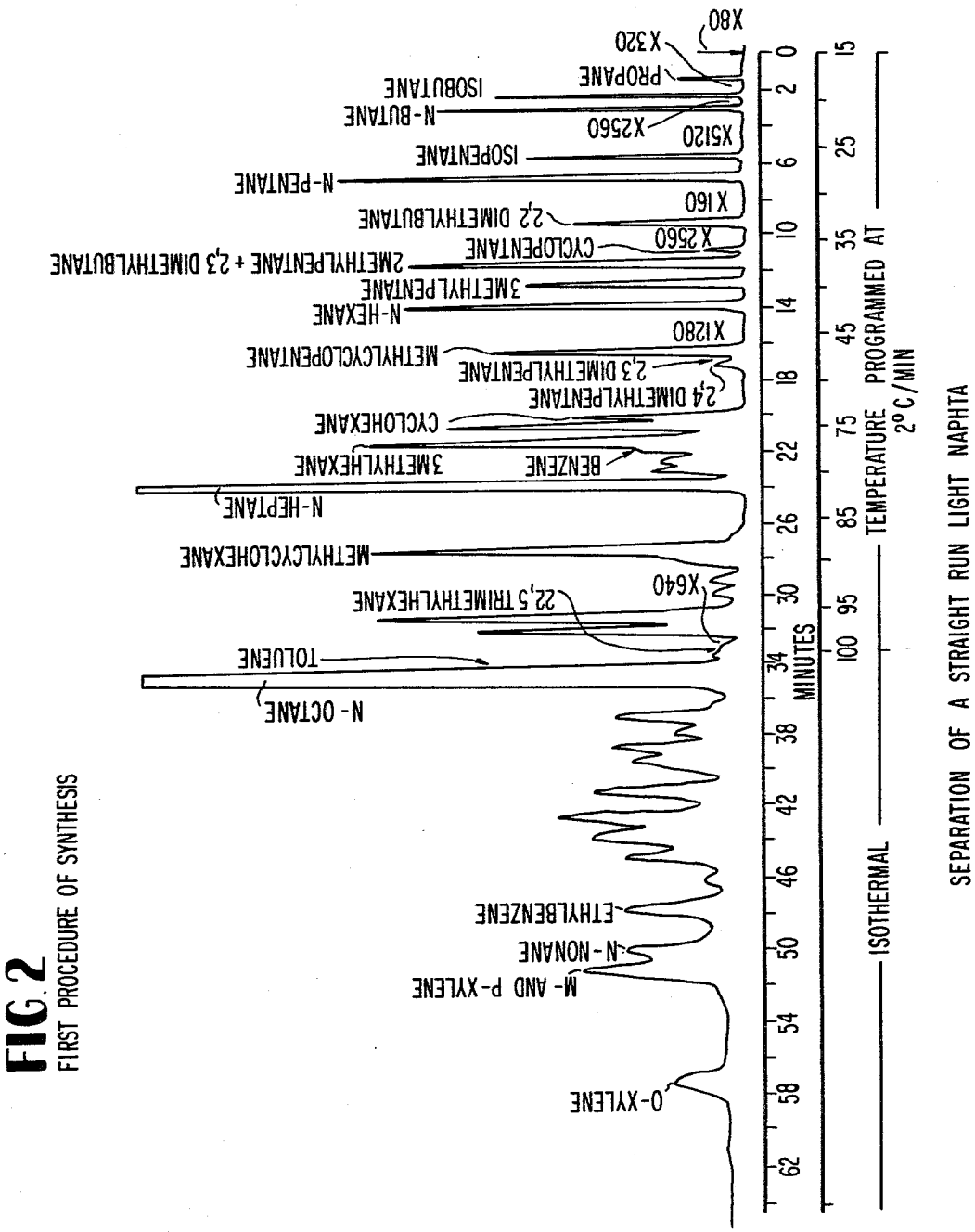

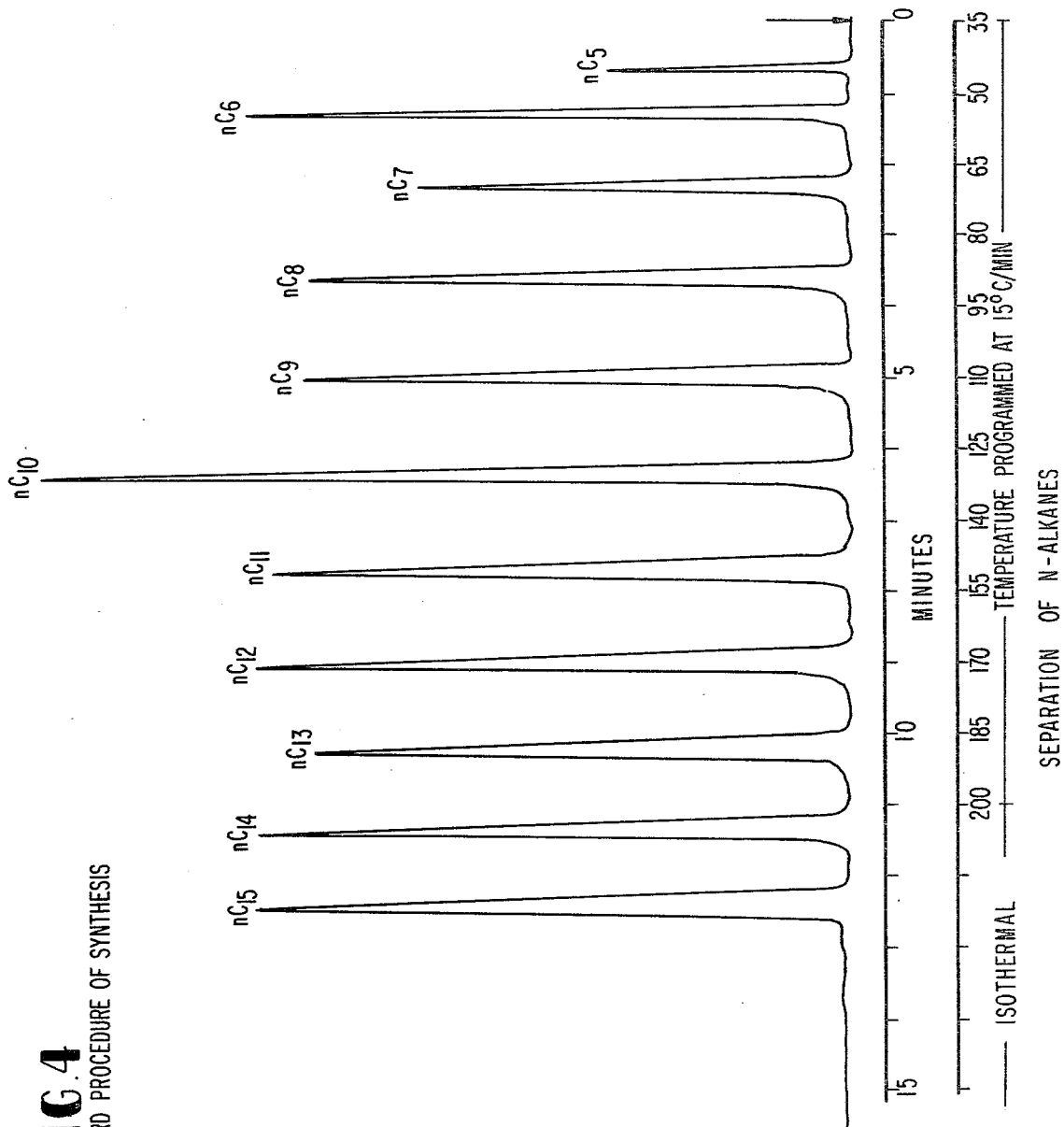

PROCESS FOR THE PREPARATION OF SILICIOUS POLYMERIC MATERIALS AND THEIR APPLICATIONS IN THE SEPARATION OF FLUIDS IN GASEOUS PHASE

RELATIONSHIP TO OTHER APPLICATIONS

This application is a continuation application of Ser. No. 723,267, filed on Sept. 14, 1976, now abandoned, in turn a continuation application of Ser. No. 421,871, filed Dec. 5, 1973, abandoned.

BACKGROUND OF THE INVENTION

1. Field of the Invention

This invention relates to silicious polymeric materials obtained by:

(1) Polymerization of organic monomeric substances in the presence of high purity submicroscopic silica particles; the polymerization may be followed by a deactivation reaction with silylating agent.

(2) Addition of high purity submicroscopic silica particles to monomeric substances and coupling reagents, which will react with the silica surface hydroxyl groups, and a polymer or a monomer which is forming a polymer in the reaction medium.

(3) Through dispersion of high purity submicroscope silica particles in polymeric organic substances.

The silicious polymeric material can be used as the stationary phase in gas chromatography for the separation of organic and inorganic fluid substances.

2. Description of the Prior Art

The use of silica in polymers as an additive in small quantities, usually in the range of 1–5%, is well known. In this case, the object is to modify the physical properties of the polymer in order to meet final technological applications. This is the case when silica is used as a "compounder" in polymers and elastomers. The addition usually follows the polymerization operation, generally being done previously to or simultaneoulsy with finishing operations on the polymer.

Organic-inorganic compositions have already been successfully used in gas chromatography, e.g., those commercially available under the tradename Durapak which are obtained through the esterification of porous glass microbeads, (the beads being commercially available as Porasil) with organic molecules of relatively low molecular weight (Halasz, I.E., Sebastian, I.—"New Stationary Phase for Chromatography"—Angew, Chem. 81, 464 (1969)). In such a case, the porous structure is provided by the glass microbeads, therefore, the porosity capability exists before the synthesis.

SUMMARY OF THE INVENTION

In this invention, the silica is present in amounts above 20% by weight, preferably above 60% by weight, and it can be present (see procedures 1 and 2), or not (see procedure 3), during the polymerization reaction. In this invention, the product is a new material having physical, chemical and organoleptic properties different from the starting silica and the polymer per se.

The polymeric materials obtained through this invention are solid, usually white, highly porous, of relatively high surface area, thermally stable and have good mechanical strength. Through crushing and sieving of these polymeric materials, particles are obtained which can be packed into a gas chromatographi column and provide excellent results with respect to permeability, efficiency and selectivity. Their excellent permeability, always desired in a gas chromatographic column, derives from the mechanical stability of the material; the efficiency depends mainly on the nature of the polymer and on the polymer to silica ratio; the selectivity varies mainly according to the nature of the polymer.

The polymeric materials of the present invention can be successfully employed in the separation of polar and nonpolar fluid organic mixtures.

The silica used in the preparation of the novel polymeric material can be characterized by the following properties: high purity (containing no calcium, sodium and magnesium and substantially free from metallic oxides), nonporous, finely divided into submicroscopic particles (smaller than 500 angstroms), of a surface area above 50 $m^2/g$ and obtained through the hydrolysis of a silicium derivative, e.g., silicium tetrachloride.

The organic component of the novel polymeric material can be chosen with great flexibility. This is relevant because the possibility of using a great variety of monomeric or/and polymeric substances considerably widens the field of application of the silicious polymeric material since one can choose the organic component used according to the desired properties in the resulting material.

When the synthesis procedure involves a polymerization, any liquid, waxy or solid substance can be used as long as it can be used as a monomer, i.e., it possesses functional groups able to undergo polymerization and it can be dissolved in or is miscible with the reaction medium where the silica particles are suspended.

When the synthesis is performed through dispersion of submicroscopic silica in the polymer, any solid, waxy or liquid polymer can be used as the organic component as long it is soluble in a suitable solvent.

The silicious polymeric material of this invention can be prepared according to three basic synthesis procedures which are described in detail below with illustrative examples.

BRIEF DESCRIPTION OF THE DRAWINGS

FIGS. 1–4 show the results of various gas chromatographic separations.

DETAILED DESCRIPTION OF THE INVENTION

First Synthesis Procedure

Figure 1:
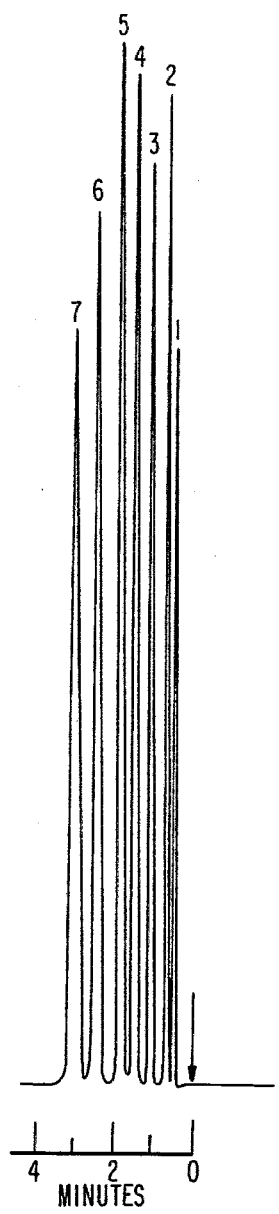

According to this procedure, the silicious polymeric material is synthesized through the dispersion of the finely divided silica in the polymer while forming the polymer (i.e., the polymerization occurs in the presence of the finely divided silica particles) in such way that the silica particles are intimate disseminated between the polymeric organic chains. (See examples 1, 2, 3 and 4).

According to the chromatographic applications, an elimination of polar groups may be desired; this is accomplished through deactivation using the well known technique of silylation (see Alan E. Pierce—"Silylation of Organic Compounds", Pierce Chemical Company, Rockford, Ill.

EXAMPLE 1

10 g of silica were suspended in 400 ml of xylene and transferred into a 1-liter round-bottomed flask. Then 6.33 g DDI 1410-diisocyanate, a product of General Mills Chemical, Inc., consisting of a long chain highly branched aliphatic diisocyanate, were added all at once and, dropwise, a solution of 1.67 g trimethylhexamethylenediamine in 150 ml xylene was added. The flask was then equipped with a reflux condenser, a CaCl$_2$ drying tube, and a magnetic stirrer.

The reaction mixture was stirred and refluxed overnight at 142° C. and at atmospheric pressure. The resulting gel filtered off, suspended in about 500 ml of benzene and filtered again. This suspension filtration procedure was repeated twice more. The resulting product was dried in air, crushed and sieved.

When the product is intended to separate relatively polar compounds, a further preparation step, a silylation, is advisable. Accordingly, the sieved particles were refluxed for one day at 110° C. and at atmospheric pressure in a 4% hexamethyldisilazane solution in toluene. The product was then washed several times with petroleum ether and dried in air.

EXAMPLE 2

10 g of silica were suspended in 500 ml of xylene and transferred into a 1-liter round-bottomed flask. Then, 8.0 g of DDI 1410-diisocyanate were added and the mixture refluxed for 48 hours at 142° C. while open to the atmosphere.

After cooling to ambient temperature, 1.0 g n-butylamine was added and the refluxing was continued for one more hour at the same conditions. Finally, the resulting gel was filtered, washed, dried, crushed and sieved as in example 1.

EXAMPLE 3

10 g of silica were suspended in 500 ml of xylene and transferred into 1-liter round-bottomed flask. Then, 6.8 g DDI 1410-diisocyanate and 1.2 g diethyleneglycol were added all at once.

The flask was equipped with a reflux condenser plus CaCl$_2$ drying tube. After one night of magnetic stirring and refluxing at 142° C. while the system was open to the atmosphere, the resulting product was filtered, washed, dried, crushed and sieved as in example 1.

EXAMPLE 4

10 g of silica were thermally treated overnight at 500° C. in a high temperature furnace. The silica was then transferred to a 1-liter round-bottomed flask and suspended in 400 ml of xylene. Next, 7.18 g DDI 1410-diisocyanate were added all at once and a solution of 0.82 g of diethylenetriamine in 100 ml xylene was dropwise added.

The flask was equipped with a reflux condenser, a CaCl$_2$, drying tube and a magnetic stirrer, and the system was refluxed overnight at 142° C., while open to the atmosphere. The resulting gel was filtered off, suspended in about 300 ml of chloroform and filtered again. This suspension/filtration procedure was repeated twice. The resulting product was dried in air, crushed and sieved.

For the analysis of relatively non-polar compounds, such as aromatic, olefinic, naphthenic and paroffinic hydrocarbons, the material is ready for use. However, for applications in the analysis of highly polar compounds such as alchools, betones, esters, amines, etc. the sieved material was deactivated through silylation, as described in example 1.

Second Synthesis Procedure

According to this synthesis procedure of the silicious polymeric material, the organic component and the finely divided submicroscopic silica are combined through chemical coordinative bonds. The bonds are established through coupling reagents, which react with hydroxyl groups on the silica surface and additionally provide a linkage to the polymer.

For example, the hydroxyl groups on the surface of the silica can be first reacted with a coupling reagent which has at least two reactive functional groups: while one links to the silica, the other remains free for bonding to the polymer.

Instead of performing a two step synthesis, the procedure can be carried out in only one step, if desired. In this case, the coupling reagent is aded together with the monomers and will simultaneously react during the polymerization with the hydroxyl groups on the surface of the silica and the polymer being formed.

Generally, the products synthesized in two steps exhibit better chromatographic properties.

Depending upon the use, the products may be or may be not deactivated through silylation with a proper reagent. (See examples 5, 6, 7 and 8).

EXAMPLE 5

A mixture of 10 g of silica, 40 g of 3-amino-propanol and 200 ml of xylene was refluxed overnight at 142° C. and atmospheric pressure in a 500 ml round-bottomed flask equipped with a magnetic stirrer, a reflux condenser and a CaCl$_2$ drying tube. The product was filtered off and washed several times successively with benzene and methylene chloride. An elemental nitrogen analysis of the product showed that 0.75 m mol 3-aminopropanol was chemically bonded to the silica surface, amounting to about a 50% reaction yield.

The product was suspended in 400 ml of xylene, transferred into a 1-liter round-bottomed flask and 6.33 g of DDI 1410-diisocyanate were added all at once, followed by the dropwise addition of 1.08 g trimethylhexamethylenediamine in 150 ml of xylene while the mixture was stirred. After refluxing overnight at 142° C. with the system open to the atmosphere, the products was filtered off, washed dried, crushed sieved and silylated as in example 1.

EXAMPLE 6

10 g of silica were mixed with sufficient diethylene glycol to yield a viscous paste.

This paste was reacted for 2 hours without the application of an external pressure at 250° C. in a Parr-Bomb in order to esterify the silica hydroxyl groups substantially quantitatively. The product was suspended in acetone, filtered, suspended again in methylene chloride and filtrated again. This suspension/filtration procedure was repeated once more and, finally, the product was suspended in 500 ml of xylene and transferred into a 1-liter round-bottomed flask. Impurities, such as water and alchools, were removed via azeotropic distillation.

Thereafter, 1.0 g of trimethylhexamethylene diisocyanate and about 100 mg of zinc cyclohexane butyrate catalyst dissolved in 10 ml of triethylamine were added thereto. The flask was equipped with a reflux condenser and a CaCl$_2$ drying tube and the reaction mixture was refluxed overnight at 142° C. while open to the atmosphere. The product was filtered, washed and suspended again in 400 ml of xylene. Next, 1.98 g of trimethylhexamethylenediamine was added all at once, followed by the dropwise addition of 3.00 g DDI 1410-diisocyanate dissolved in 150 ml of xylene. The mixture was refluxed again overnight at 142° C. while open to the atmosphere and the final product filtered, washed, dried, crushed, sieved and silylated as in example 1.

EXAMPLE 7

10 g of silica were thermally treated overnight at 500° C. in a high temperature furnace. The silica was then transferred into a 1-liter round-bottomed flask equiped with a reflux condenser and a $CaCl_2$-drying tube. 500 ml of zylene and 5 grams of n-betaamino-ethyl-gammaaminopropyltrimethoxysilane (a product from Dow Corning) were added and the mixture refluxed overnight at 142° C., with the system open to the atmosphere.

The product was filtered and the suspension/filtration procedure with xylene was repeated twice. Finally, the product was suspended in 500 ml of benzene and transferred into a 1-liter round-bottomed flask. After the addition of 8.0 g DDI 1410-diisocyanate, the mixture was refluxed for one day at 80° C. with an open reflux condenser.

The next day, 1.0 g of trimethylhexamethylenediamine dissolved in 100 ml of benzene was dropwise added over 3 hours, at room temperature, with magnetic stirring. Finally, the mixture was refluxed for one hour at 80° C. in a system open to the atmosphere, filtered, washed, dried, crushed, sieved and silylated as in example 1.

EXAMPLE 8

10 g of silica were suspended in 500 ml of xylene in a 1-liter round-bottomed flask and traces of water were removed from the mixture through azeotropic distillation. Then, 0.66 g of gammaamino-propyl-triethoxysilane (a product from Union Carbide) was added and the flask equipped with a reflux condenser, $CaCl_2$ drying tube and a magnetic stirrer. After one day of refluxing at 142° C. with the system open to the atmosphere the ethanol formed during the reaction was separated from the mixture through distillation.

Next, 5.55 g of DDI 1410-diisocyanate were added all at once and the mixture was refluxed for three more hours as above. Afterwards, 1.20 g of trimethylhexamethylenediamine was added slowly and the mixture was refluxed again as above for three more hours. The resulting gel was filtered, washed, dried, crushed and sieved as in example 7.

For the analysis of relatively non-polar compounds the material is ready for use. However, for use in the analysis of highly polar compounds, the materials was deactivated through silylation as decribed in example 1.

Third Synthesis Procedure

According to this method of synthesizing the silicious polymeric material, a polymer dissolved in a suitable organic solvent is added to the finely divided silica already suspended in the same organic solvent. After stirring, the solvent is removed, leaving an intimate mixture of polymer and silica (See examples 9, 10 and 11).

Following basically the same procedure, it is possible to modify the polymer through chemical reactions; for instance, after adding the suspended silica into the solution containing the polymer, the latter can be modified through crosslinking reactions (See example 12).

Another possibility is to modify the silica surface before distributing it through the polymer.

The silica surface modifications are performed via organic molecules bonded to the hydroxyl groups on the silica surface; nevertheless, these molecules are not chemically bonded through coordinative linkages to the polymeric matrix, the modified silica simply being distributed through the polymer as in the case of the pure silica.

EXAMPLE 9

10 g of silica were suspended in 250 ml of benzene and combined with a solution of 10 g of polystyrene dissolved in 250 ml of benzene. The mixture was transferred into a 1-liter round-bottomed flask and the benzene was carefully removed by a rotating evaporator until a viscous gel resulted. The gel was dried, crushed and sieved as in example 1.

EXAMPLE 10

10 g of VERSAMID 900 (a product from General Mills Chemical Inc., consisting of a polyamide) were dissolved in a solvent mixture of 500 ml of benzene and 50 ml of acetonitrile by means of refluxing in a 1-liter round-bottomed flask in a system open to the atmosphere. This solution was combined with 10 g of silica. Afterwards, the solvent was removed by means of a rotating evaporator and the material dried, crushed and sieved as in example 1.

EXAMPLE 11

10 g of silica were suspended in about 300 ml of methanol or chloroform. Next, the same quantity of diethylene glycol or of one of the Carbowaxes (Carbowax 400, 600, 1000, 1,540, 4,000, 6,000 or 20,000) was dissolved in the same volume of the same solvent. After combining the suspension with the solution, the solvent was slowly removed by means of a rotating evaporator. The resulting solid material was crushed and sieved.

EXAMPLE 12

6.0 g of VERSAMID 900 were dissolved in a solvent mixture of 500 ml of xylene and 500 ml of dimethylformamide by refluxing for two hours at 142° C. in a 1-liter round-bottomed flask in a system open to the atmosphere. Then, 10 g of silica were added and impurities, such as water and amines, were removed through azeotropic distillation. Next, 2.0 g of DDI 1410-diisocyanate were added and the mixture refluxed overnight as above. The resulting gel was filtered, washed, dried, crushed and sieved as decribed in Example 1.

Figure 3:
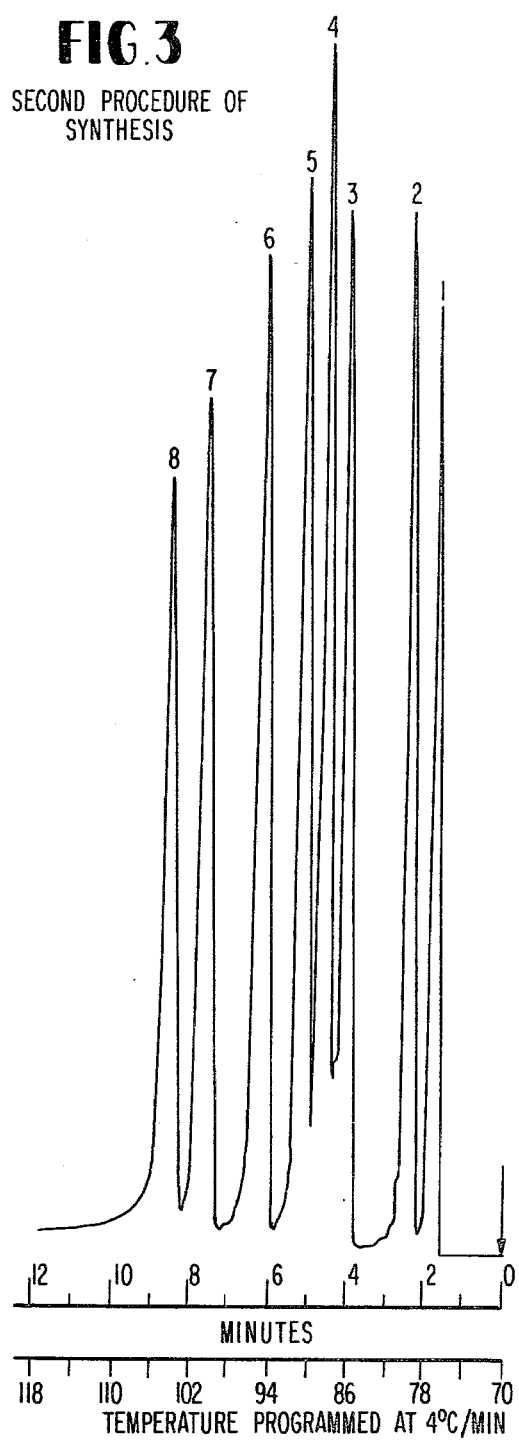

The materials synthesized according to the procedures and examples detailed above have presented good results when employed as the stationary phase in gas chromatography for separation of fluid organic compounds. They showed outstanding results with respect to speed, efficiency and selectivity as it can be seen from FIGS. 1 to 4.

While the present invention has been illustrated by a detailed description of the preferred embodiments thereof, it will be obvious to these skilled in the art that various changes in form and details can be made therin without departing from the true scope of the invention. For that reasons, the invention must be measured by the claims appended hereto and not by the foregoing preferred embodiments.

What is claimed is:

1. A process for separating the components of a mixture of non-polar organic compounds by gas phase chromatography comprising passing said mixture in a gaseous state through a solid stationary phase of microporous free flowing powder having a high surface area and good thermal stability, said phase comprising an intimate mixture of an organic macro molecular component (A) and (B) non-porous high purity silica in particles smaller than 500 angstroms which does not contain calcium, sodium or magnesium and is substantially free of metallic oxides, said silica having a surface area greater than 50 m$^2$/g, said macro molecular component (A) having been intimately mixed with the silica (B) by reaction of the monomeric components forming the macro molecular component (A) in the presence of said silica, whereby said silica particles are intimately disseminated throughout organic macro molecular chains without coordinate chemical bonding linkages between the silica and the organic macro molecular component.

2. The process of claim 1 wherein the macro molecular component is formed by reaction between amine and diisocyanate.

3. The process of claim 1 wherein the macro molecular component is formed by reaction between alcohol and diisocyanate.

4. The process of claim 1 wherein the reaction product is dried, crushed and sieved prior to use as said stationary phase.

5. The process of claim 1 wherein said silicious-polymeric organic compound is reacted with hexamethyldiasilazane and then is dried, crushed and sieved.

6. The process of claim 1 wherein said monomeric components are selected from the group consisting of amines, alcohols and organic isocyanates.

7. A process for separating the components of a mixture of non-polar organic compounds by gas phase chromatography comprising passing said mixture in a gaseous state through a solid stationary phase of microporous free flowing powder having a high surface area and good thermal stability, said phase comprising an intimate mixture of an organic macro molecular component (A) and (B) non-porous high purity silica in particles smaller than 500 angstroms which does not contain calcium, sodium or magnesium and is substantially free of metallic oxides, said silica having a surface area greater than 50 m$^2$/g, said macro molecular component (A) having been intimately mixed with the silica (B) by dispersing said silica particles (B) in said macro molecular component (A), whereby said silica particles are intimately disseminated throughout organic macro molecular chains without coordinate chemical bonding linkages between the silica and the organic macro molecular component.

8. The process of claim 7 wherein after said dispersing, the product is dried, crushed and sieved.

9. The process of claim 7 wherein said silicious-polymeric organic compound is reacted with hexamethyldiasilazane and then is dried, crushed and sieved.

10. The process of claim 7 wherein said macro molecular component is polystyrene.

11. The process of claim 7 wherein said macro molecular component is a polyamide.

12. The process of claim 7 wherein said macro molecular component is formed of diethylene glycol or a carbowax.

13. The process of claim 7 wherein said macro molecular component is cross-linked after said dispersing is carried out.

14. The process of claim 13, wherein the macromolecular component is a polyamide and the cross linking agent is a diisocyamate.

15. The process of claim 7 wherein the surfaces of the silica particles are modified before said dispersing.

* * * * *

UNITED STATES PATENT AND TRADEMARK OFFICE
CERTIFICATE OF CORRECTION

PATENT NO. : 4,190,425
DATED : February 26, 1980
INVENTOR(S) : Wilhelm BRUENING et al It is certified that error appears in the above—identified patent and that said Letters Patent is hereby corrected as shown below:

IN THE HEADING:

ADD:

Foreign Application Priority Data

December 5, 1972  Brazil..................... 8559/P-72
December 5, 1972  Brazil..................... 8560/P-72
December 5, 1972  Brazil..................... 8561/P-72

Signed and Sealed this

Twentieth Day of May 1980

[SEAL]

Attest:

SIDNEY A. DIAMOND

Attesting Officer    Commissioner of Patents and Trademarks